United States Patent
Takeya et al.

(10) Patent No.: US 8,903,374 B2
(45) Date of Patent: Dec. 2, 2014

(54) SYSTEM FOR CALIBRATING WIRELESS COMMUNICATIONS DEVICES

(75) Inventors: Tomoki Takeya, Santa Clara, CA (US); Justin Gregg, San Francisco, CA (US); Ruben Caballero, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1357 days.

(21) Appl. No.: 12/128,534

(22) Filed: May 28, 2008

(65) Prior Publication Data

US 2009/0298440 A1    Dec. 3, 2009

(51) Int. Cl.
   *H04B 17/00*  (2006.01)
   *H04B 1/40*   (2006.01)
   *H01Q 1/24*   (2006.01)

(52) U.S. Cl.
   CPC .......... *H01Q 1/243* (2013.01); *H04B 1/40* (2013.01); *H04B 17/003* (2013.01); *H04B 17/0007* (2013.01)
   USPC ........ 455/423; 455/424; 455/425; 455/67.11; 455/67.14; 455/115.1; 455/226.1

(58) Field of Classification Search
   CPC ................................................... H04B 17/001
   USPC ................... 455/423, 424, 425, 67.11, 67.14, 455/115.1–4, 226.1–4
   See application file for complete search history.

(56) References Cited

U.S. PATENT DOCUMENTS

| | | | |
|---|---|---|---|
| 4,137,499 A | 1/1979 | Caudel | |
| 6,735,422 B1 | 5/2004 | Baldwin et al. | |
| 6,819,910 B2 | 11/2004 | Shi et al. | |
| 6,819,938 B2 | 11/2004 | Sahota | |
| 7,110,469 B2 | 9/2006 | Shi et al. | |
| 7,148,699 B1 | 12/2006 | Stark | |
| 7,239,889 B2 * | 7/2007 | Saari et al. | 455/552.1 |
| 7,881,680 B1 * | 2/2011 | Viehweg et al. | 455/114.3 |
| 8,095,089 B1 | 1/2012 | Viehweg et al. | |
| 2004/0203443 A1 | 10/2004 | Woolf et al. | |
| 2005/0156662 A1 * | 7/2005 | Raghupathy et al. | 330/10 |
| 2005/0227646 A1 * | 10/2005 | Yamazaki et al. | 455/127.3 |
| 2006/0160534 A1 | 7/2006 | Jung et al. | |
| 2006/0199552 A1 * | 9/2006 | Blech et al. | 455/127.1 |

(Continued)

OTHER PUBLICATIONS

"R&S CMU200 Universal Radio Communication Tester", Rohde & Schwarz, Nov. 2007.

(Continued)

*Primary Examiner* — Wen Huang
(74) *Attorney, Agent, or Firm* — Treyz Law Group; G. Victor Treyz; Michael H. Lyons (57) ABSTRACT

A wireless electronic device such as a portable electronic device may contain a baseband module. Power amplifier circuitry in the device may amplify radio-frequency signals for transmission. During calibration measurements, a computer directs the baseband module to generate control signals that adjust the gain of the power amplifier circuitry. The computer may also direct the baseband module to generate a series of modulated or unmodulated test tones at one or more communications channel frequencies. A power sensor may be connected to the output of the power amplifier circuitry using a transmission line path. The computer and power sensor may be used in making power measurements on radio-frequency signals at the output of the power amplifier while power amplifier gain and test tone frequency adjustments are being made. Power amplifier calibration data may be produced and stored in the electronic device based on the power measurements.

16 Claims, 5 Drawing Sheets

(56) References Cited

U.S. PATENT DOCUMENTS

| | | |
|---|---|---|
| 2008/0002786 A1 | 1/2008 | Kerth et al. |
| 2008/0020746 A1* | 1/2008 | Alexandar et al. ............ 455/423 |
| 2008/0057874 A1 | 3/2008 | Shvodian et al. |
| 2008/0182530 A1* | 7/2008 | Mueller et al. ............. 455/115.1 |
| 2008/0268789 A1* | 10/2008 | Plaumann et al. ......... 455/67.14 |
| 2009/0256644 A1* | 10/2009 | Knudsen et al. ................ 333/32 |
| 2009/0298440 A1 | 12/2009 | Takeya et al. |

OTHER PUBLICATIONS

Donovan et al., U.S. Appl. 12/625,534, filed Nov. 24, 2009.

* cited by examiner

A baseband module or other circuitry in the electronic device

SYSTEM FOR CALIBRATING WIRELESS COMMUNICATIONS DEVICES

BACKGROUND

This invention relates generally to calibrating electronic devices, and more particularly, to calibrating radio-frequency circuitry in wireless communications devices.

Electronic devices such as handheld electronic devices and other portable electronic devices are becoming increasingly popular. Examples of handheld devices include handheld computers, cellular telephones, media players, and hybrid devices that include the functionality of multiple devices of this type. Popular portable electronic devices that are somewhat larger than traditional handheld electronic devices include laptop computers and tablet computers.

Electronic devices such as portable electronic devices are often provided with wireless communications capabilities. For example, handheld electronic devices may use long-range wireless communications to communicate with wireless base stations and may use short-range communications to communicate with accessories and local networks.

Electronic devices with wireless communications capabilities often undergo calibration operations during manufacturing. A typical device includes a processor and other circuitry that generates data. A typical device also includes radio-frequency transceiver circuitry for transmitting and receiving data over an antenna. Amplifiers may be used to increase the strength of the radio-frequency signals. For example, adjustable-gain radio-frequency power amplifier circuitry may be used to amplify transmitted radio-frequency signals. If the power amplifier circuitry is not properly calibrated, the device may produce radio-frequency signals that are too weak or too strong. Signals that are too weak may cause the device to operate incorrectly. Signals that are too strong may lead to operational and regulatory compliance problems.

Conventional calibration systems are built around complex and expensive radio communication test equipment. In a typical scenario, a device to be calibrated is placed in a shielded box and connected to a radio communication tester and a computer via cables. During calibration operations, the radio communication tester establishes a bidirectional communications link with the device and characterizing radio-frequency signal measurements are made. The results of these measurements are then processed to produce power measurement data for device calibration.

With conventional calibration schemes of this type, the process of establishing the wireless communications link between the tester and the device limits production line throughput. Moreover, the radio communication test equipment uses expensive spectrum analyzing circuits in making signal measurements, which adds to the complexity and cost associated with calibration.

It would therefore be desirable to provide improved techniques for calibrating radio-frequency circuitry in wireless communications devices.

SUMMARY

Portable electronic devices and other electronic devices with wireless communications capabilities are provided that include radio-frequency power amplifier circuitry. A radio-frequency power amplifier in an electronic device may amplify radio-frequency signals to be transmitted by the device. The gain of the radio-frequency power amplifier may be controlled by a control signal provided at a control input. A baseband module or other circuitry in the electronic device may contain control circuitry. The control circuitry may produce the control signal for the control input of the power amplifier. For example, the control circuitry may contain a digital-to-analog converter or other circuit that produces an analog control voltage or digital signal that serves as a gain-adjusting control signal for the radio-frequency power amplifier. The control circuitry may be used to generate radio-frequency test signals (test tones) at frequencies associated with various communications channels. The test tones may be pure unmodulated carrier tone signals or may be modulated using pseudorandom modulation data (as an example).

As initially fabricated, the gain of the power amplifier circuitry in an electronic device may vary somewhat from the nominal gain level that is desired. These manufacturing variations may be overcome by producing radio-frequency power amplifier calibration data. The calibration data may represent a series of corrective gain adjustments that the electronic device is to use when amplifying radio-frequency signals during normal operation.

Calibration data may be produced using a computer and a power sensor. The power sensor may be connected to the output of the radio-frequency power amplifier using a test fixture that has an associated transmission line path. During calibration measurements, the computer directs the baseband module in the electronic device to produce a variety of test tones in different communications channels while varying the gain settings of the radio-frequency power amplifier circuitry. The test tones may be provided to the input of the power amplifier circuitry. Corresponding amplified versions of the radio-frequency test tones may be provided at the output of the power amplifier circuitry. The transmission line path may be used to convey these amplified radio-frequency signals to the power sensor.

Power measurements may be made of the amplified radio-frequency signals using the power sensor and the computer. The computer can analyze the power measurement data to produce corresponding calibration information. The calibration information may be loaded into memory in the electronic device. During normal operation, control circuitry in the electronic device may calculate appropriate values for the control signals that are to be applied to the power amplifier circuitry based on the calibration data, thereby ensuring that accurate power levels are produced when transmitting radio-frequency signals.

Further features of the invention, its nature and various advantages will be more apparent from the accompanying drawings and the following detailed description of the preferred embodiments.

DETAILED DESCRIPTION

The present invention relates to calibrating radio-frequency circuitry in electronic devices with wireless communications capabilities.

The electronic devices may be, for example, portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices. With one suitable arrangement, the electronic devices may be handheld electronic devices.

The electronic devices may be, for example, cellular telephones, media players with wireless communications capabilities, handheld computers (also sometimes called personal digital assistants), remote controllers, global positioning system (GPS) devices, and handheld gaming devices. The electronic devices may also be hybrid devices that combine the functionality of multiple conventional devices. Examples of hybrid electronic devices include a cellular telephone that includes media player functionality, a gaming device that includes a wireless communications capability, a cellular telephone that includes game and email functions, and a portable device that receives email, supports mobile telephone calls, has music player functionality and supports web browsing. These are merely illustrative examples.

In devices such as these, radio-frequency signals are typically amplified using power amplifier circuitry. For example, a power amplifier may be used to amplify received radio-frequency signals before those signals are processed by receiver circuitry in a device. A power amplifier may also be used to boost radio-frequency signals prior to transmission over an antenna.

Radio-frequency amplifiers such as the power amplifiers that are used in amplifying transmitted radio-frequency signals may be adjustable. For example, these amplifiers may include blocks of circuitry that can be selectively enabled and disabled. When a high gain configuration is desired, all of the blocks of amplifier circuitry may be enabled. When a low gain configuration is needed, some of the amplifier circuitry may be disabled to conserve power. Gain blocks may also have analog or digital control inputs for making gain level adjustments. For example, a power amplifier may have an analog voltage control input or digital control input that is used in adjusting the gain of the power amplifier. These control signals may be produced, for example, at the output of a digital-to-analog converter circuit (e.g., when producing an analog control voltage) or at the output of a digital control circuit (e.g., when producing a digital control signal).

Due to manufacturing variations, it is generally not possible to produce uncalibrated radio-frequency power amplifier circuitry that exhibits precisely controlled amounts of gain in a wide dynamic range of power levels. Calibration is therefore generally used to ensure that the power amplifier circuitry produces desired amounts of gain across the desired range of power levels.

Figure 1:
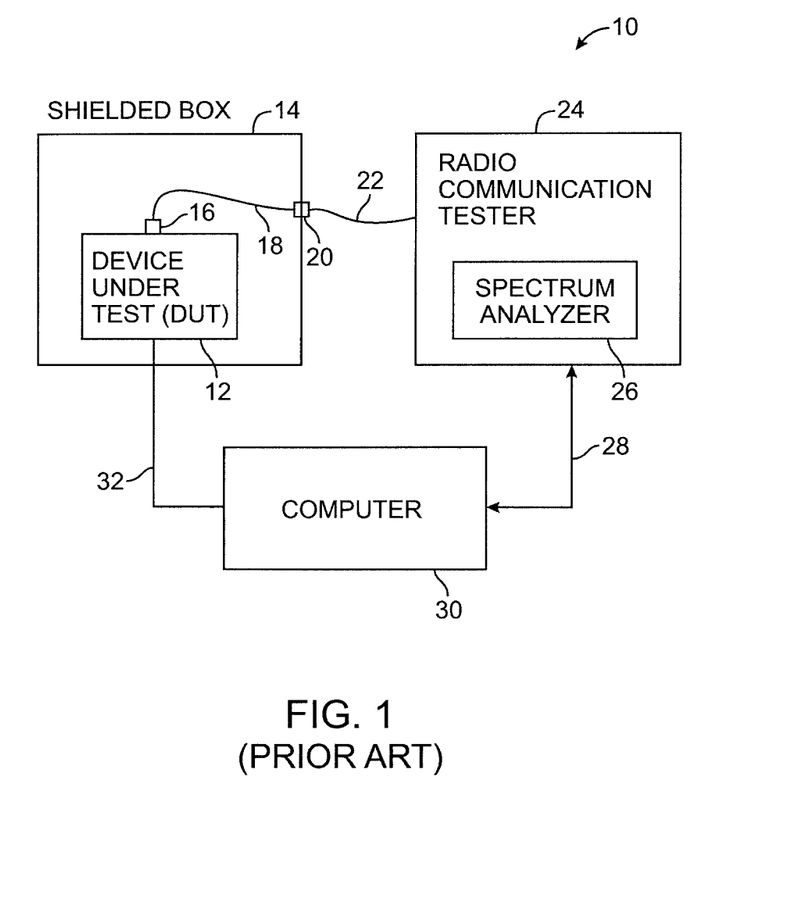
FIG. 1 is a diagram of a conventional cellular telephone calibration system based on a radio communication tester.

A conventional manufacturing system that may be used to calibrate power amplifier circuitry on a wireless electronic device is shown in FIG. 1. As shown in FIG. 1, system 10 includes a device under test (DUT) such as device under test 12. Device under test 12 may be, for example, a cellular telephone. During calibration operations, device under tests 12 communicates with external equipment using a bidirectional link. To avoid interference from adjacent devices in the production environment or other external signals, device 12 is placed within a shielded box such as shielded box 14. Box 14 may be a metal enclosure that prevents radio-frequency interference from reaching device 12.

Device under test 12 is typically mounted to a test fixture in box 14. The text fixture is used in coupling transmission line 18 to radio-frequency connector 16. Radio-frequency connector 16 may be, for example, a radio-frequency connector that normally shorts the output of a power amplifier and other radio-frequency circuitry to an antenna in device 12. When connected to cable 18, radio-frequency connector 16 may form an open circuit between the output of the power amplifier and the antenna. At the same time, radio-frequency connector 16 may electrically connect the output of the power amplifier to transmission line 18.

Transmission line 18 may be connected to cable 22 using a connector such as radio-frequency connector 20. Cable 22 is needed to connect shielded box 14 to radio communication tester 24. Because radio communication tester 24 is typically fairly large, tester 24 is generally mounted on a stand or other mount that is at a distance from shielded box 14. As a result, cable 22 may be fairly long and may be subject to wear and failure.

Computer 30 may be coupled to tester 24 via path 28 and may be coupled to device 12 using path 32 and the fixture in box 14. Path 28 may be used to receive radio-frequency power measurements from tester 24. Path 32 may be used to covey data signals to device 12. During calibration measurements, path 32 may be used to direct power amplifier circuitry in device 12 to produce series of different gain settings (e.g., by producing a series of different analog gain control voltages or a series of digital gain control signals). Following measurements with radio communication tester, calibration data may be stored in device 12 over path 32. The calibration data may be used by device 12 to ensure that the power amplifier circuitry in device 12 operates appropriately (i.e., in accordance with calibrated settings).

Radio communication testers such as tester 24 include circuitry for establishing bidirectional radio-frequency communications links with device 12 over paths 18 and 22. Once this link has been established, device 12 may transmit radio-frequency signals to tester 24 and tester 24 can analyze these signals using circuitry such as spectrum analyzer 26. In a typical scenario, a vector signal analyzer may be used in tester 24 to extract phase and quadrature (IQ) constellation data from received radio-frequency signals. Power calculations may be performed on the IQ constellation data (e.g., by computing vector lengths in an IQ plot). Average powers can be derived from the IQ constellation data (e.g., by averaging the powers of the symbol vectors in an IQ plot).

The need to rely on the use of radio communication testers such as tester 24 to perform calibration operations during manufacturing can be burdensome. The radio communication tester units are expensive because they include circuitry for establishing protocol-compliant bidirectional radio-frequency links with devices being tested. The inclusion of complex spectrum analyzer circuitry and the circuitry used to process IQ constellation data also adds to the cost of radio communication testers. Advanced options are sometimes available to help increase testing speeds, but these advanced options add additional cost and complexity to the test system and add to the burden of training personnel to properly operate the test equipment. Moreover, the use of shielded box 14 and cable 22 are not always desirable. Tester 24, cable 22, and box 14 consume valuable real estate on the test floor. Because cable 22 is generally fairly long, cable 22 is be subject to damage and therefore represents an undesirable possible point of failure in typical manufacturing environments. Yet another difficulty related to using conventional test systems of the type shown in FIG. 1 relates to scalability. If it is desired to manufacture large quantities of wireless electronic devices in a short period of time, it may be impractical to purchase and operate a sufficient quantity of radio communications testers to calibrate all of the devices. In view of these challenges, it would be desirable to be able to provide improved ways in which to calibrate radio-frequency wireless electronic devices during manufacturing.

Figure 2:
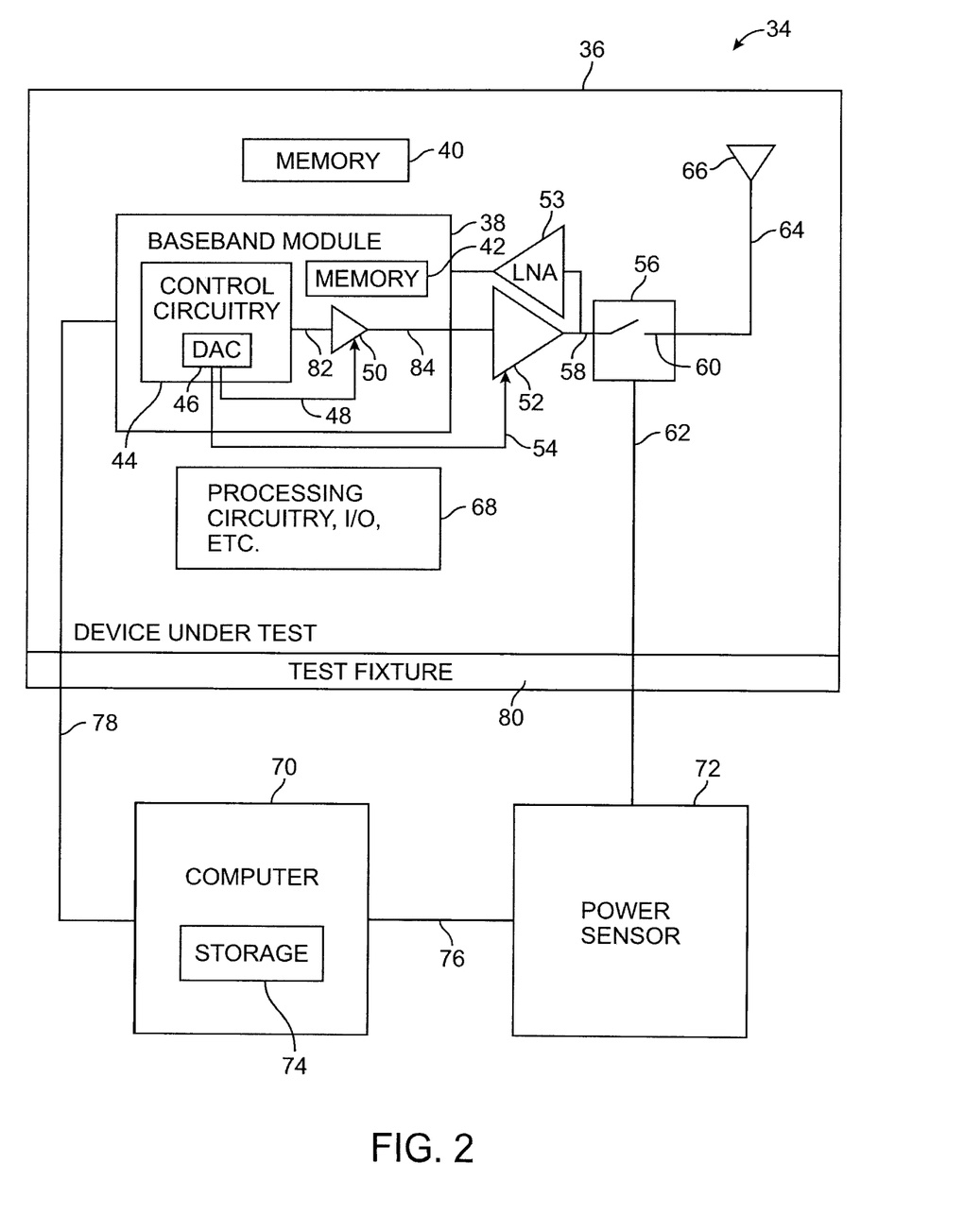
FIG. 2 is a diagram of a calibration system in accordance with an embodiment of the present invention.

An illustrative calibration system in accordance with an embodiment of the present invention is shown in FIG. 2. As shown in FIG. 2, system 34 may include computer 70 and power sensor 72 for testing device under test 36. Computer 70 may include storage 74 such as a hard drive, random-access-memory, solid state drive, non-volatile memory circuit, etc. Computer 70 may be a personal computer, a workstation, a test equipment station with one or more associated processors, a part of a network of computing equipment, or any other suitable computing equipment. Computer 70 may include input-output devices such as keyboards and pointing devices, a monitor, speakers, etc.

Radio-frequency power sensor 72 may be a power sensor head of the type that is sometimes attached to the main unit of a power meter. Power sensor 72 may include components such as diodes and/or resistors that are used to measure the amount of radio-frequency power that is being received by power sensor 72 from device under test 36 over path 62. Power sensor 72 is typically an order of magnitude less expensive than a conventional radio communication tester such as radio communication tester 24 of FIG. 1. This is because power sensor 72 is preferably configured to perform only a single operation—namely, measure incoming radio-frequency power. Power sensor 72 need not include spectrum analyzer circuitry, data communications circuitry, or other complex electronics and therefore need not be as physically large or complex as radio communication tester 24.

Because power sensor 72 is more compact than conventional test measurement instruments such as radio communication tester 24, it is possible to mount power sensor 72 to a test fixture or in the immediate vicinity of a test fixture such as test fixture 80. Test fixture 80 receives devices to be tested such as device 36. Test fixture 80 may include pins or other conductors that mate with electrical paths in device 36 (e.g., to help complete path 78 between computer 70 and device 36, to help complete path 62 between power sensor 72 and device 36, to apply power to device 36, etc.). Because power sensor 72 may be mounted close to fixture 80, communications path 62 may be relatively short, avoiding the need for more extensive failure-prone cables such as cable 22 of FIG. 1.

Power sensor 72 may be coupled to computer 70 using a path such as path 76. Path 76 may be, for example, a universal serial bus (USB) path or any other suitable path for conveying signals between power sensor 72 and 70. If desired, data can flow primarily or entirely from power sensor 72 to computer 70 (i.e., path 76 may be a unidirectional data path).

Device under test 36 may be a handheld electronic device, a portable electronic device, or any other suitable device. For example, device under test 36 may be a handheld device that includes both long-range and short-range wireless communications functions that require or benefit from radio-frequency amplifier calibration. As an example, device 36 may be a mobile telephone, a mobile telephone with media player capabilities, a handheld computer, a remote control, a game player, a global positioning system (GPS) device, a laptop computer, a tablet computer, an ultraportable computer, a combination of such devices, or any other suitable electronic device.

Device 36 may include processing circuitry, input-output circuitry, and other circuitry 68. Circuitry 68 may include storage. Storage in circuitry 68 may include one or more different types of storage such as hard disk drive storage, nonvolatile memory (e.g., flash memory or other electrically-programmable-read-only memory), volatile memory (e.g., battery-backed static or dynamic random-access-memory), etc.

Processing circuitry in circuitry 68 may be used to control the operation of device 36. Processing circuitry in circuitry 68 may be based on a processor such as a microprocessor (also sometimes referred to as a central processor unit or application processor) and other suitable integrated circuits such as power management units, cellular telephone processor chips, audio codecs, etc. With one suitable arrangement, processing circuitry and storage in device 36 may be used to run software on device 36 such as internet browsing applications, voice-over-internet-protocol (VOIP) telephone call applications, email applications, media playback applications, operating system functions, etc. Processing circuitry and storage may be used in implementing suitable communications protocols. Communications protocols that may be implemented using circuitry 68 include internet protocols, wireless local area network protocols (e.g., IEEE 802.11 protocols—sometimes referred to as Wi-Fi®), protocols for other short-range wireless communications links such as the Bluetooth® protocol, protocols for handling 2G and 3G cellular telephone services, etc.

Input-output devices in circuitry 68 may be used to allow data to be supplied to device 36 and to allow data to be provided from device 36 to external devices. These input-output devices may include user input-output devices such as buttons, headsets, touch screens, joysticks, click wheels, scrolling wheels, touch pads, key pads, keyboards, microphones, cameras, etc. During normal operation, a user can control the operation of the device by supplying commands through user input devices. Display and audio devices may be included in the device such as liquid-crystal display (LCD) screens or other screens, light-emitting diodes (LEDs), and other components that present visual information and status data to a user. The device may also include audio equipment such as speakers and other devices for creating sound. Audio-video interface equipment such as jacks and other connectors for external headphones and monitors may also be included.

Device under test 36 includes wireless communications circuitry. The wireless communications circuitry typically includes radio-frequency (RF) transceiver circuitry formed from one or more integrated circuits, power amplifier circuitry, passive RF components, antennas, and other circuitry for handling RF wireless signals.

In the illustrative arrangement of FIG. 2, device under test 36 has wireless communications circuitry such as baseband module 38, power amplifier 52, radio-frequency (RF) connector 56, and antenna 66.

Baseband module 38 may be implemented using one or more integrated circuits. Circuits such as module 38 may receive data to be transmitted from processing circuitry 68. For example, circuits such as module 38 may receive outgoing data corresponding to email and other data messages, voice calls, etc. Circuits such as module 38 may also be used in converting received signals into messages, voice signals, etc.

As shown in the example of FIG. 2, baseband module 38 may include integrated power amplifier circuitry 50. Power amplifier 50 may receive radio-frequency signals that are to be transmitted wirelessly over antenna 66 on input 82 and may provide corresponding amplified versions of these signals as an output on path 84. External power amplifier circuitry such as external power amplifier circuit 52 may also be used in amplifying transmitted radio-frequency signals. Power amplifier 52 may receive radio-frequency signals on path 84 and may provide corresponding amplified signals on path 58. If desired, radio-frequency signals may be amplified using only an internal power amplifier such as internal power amplifier 50 or only an external power amplifier such as external power amplifier 52. The example of FIG. 2 in which both internal and external power amplifiers are provided in device 36 is merely illustrative. The receiver path for device 36 may include a low-noise amplifier such as low-noise amplifier 53.

Baseband modules such as baseband module 38 may include internal circuitry such as digital signal processing circuitry, microprocessor circuitry, analog-to-digital converter circuits, digital-to-analog circuits, and other circuits. These circuits are shown as control circuitry 44 and digital-to-analog converter 46 in FIG. 2. Control circuitry 44 may be used in generating radio-frequency signals to provide to path 82 in response to data received from processing circuitry 68. Control circuitry 44 may also be used in controlling power amplifiers 50 and 52. If desired, processing circuitry 68 may also be used in controlling power amplifiers 50 and 52. Arrangements in which control circuitry 44 in baseband module 38 is used in controlling power amplifiers 50 and 52 during calibration operations are sometimes described herein as an example.

Control signals may be provided to amplifiers 50 and 52 using paths such as paths 48 and 54. These control signals may be used to adjust the settings of power amplifiers 50 and 52. The power amplifier settings may be used, for example, to adjust how many gain blocks are turned on in amplifiers 50 and 52, may be used to regulate the gain settings of amplifiers 50 and 52, may be used to provide digital control signals, may be used to regulate the power supply level for power amplifiers 50 and 52 (and thereby control power consumption and/or gain levels), may be used to regulate the biasing for amplifiers 50 and 52, etc. With one suitable arrangement, which is described herein as an example, digital-to-analog converter 46 or other suitable control circuitry may be used to produce an analog or digital control signal on path 48 that adjusts the magnitude of the gain produced by amplifier 50 and control circuitry 44 may be used in producing a bias voltage or digital control signal on path 54 that controls the gain of power amplifier 52. This arrangement is merely illustrative. If desired, other circuitry in device 36 may be used in adjusting the gains of power amplifiers 50 and 52.

Antenna structures in device 36 are represented schematically as antenna 66 in FIG. 2. Any suitable antenna structures may be used in device 36. For example, device 36 may have one antenna or may have multiple antennas. The antennas in device 36 may each be used to cover a single communications band or each antenna may cover multiple communications bands. If desired, one or more antennas may cover a single band while one or more additional antennas are each used to cover multiple bands. As an example, a pentaband cellular telephone antenna may be provided at one end of device 36 and a dual band GPS/Bluetooth®/IEEE-802.11 antenna may be provided at another end of device 36. Antennas may be formed using stamped metal, slot antenna structures, flex circuits having patterns of conductive traces, hybrid arrangements (e.g., hybrid planar inverted-F and hybrid inverted-F structures), etc. These are merely illustrative arrangements. Any suitable antenna structures may be used in device 36 if desired. The use of a single antenna 66 is sometimes described herein as an example.

During normal operation of device 36 by a user, the gain of the power amplifier circuitry 50 and 52 should be set to a level that ensures adequate signal strength for reliable communications, without exceeding maximum desired levels (e.g., maximum levels determined by power consumption and regulatory constraints). If the amount of radio-frequency power that is transmitted by device 36 during normal operation is too high, power may be wasted and regulatory limits on transmitted radiation may be exceeded. If the amount of radio-frequency power that is transmitted by device 36 during normal operation is too low, signal strength may be too weak to maintain an adequate communications link between device 36 and a base station, access point, or other external equipment.

Manufacturing variations may make it difficult or impossible to fabricate power amplifiers 50 and 52 with an accuracy that is sufficient to ensure that the desired transmitted radio-frequency power from device 36 will be precisely achieved when operating power amplifiers 50 and 52 at their default settings. As fabricated, power amplifiers 50 and 52 may have either too little gain or too much gain or may not have proper gain linearity across a certain dynamic range. If no calibration adjustments are made, device 36 may not function properly. It is therefore generally desirable to calibrate device 36 as part of the manufacturing process. Calibration operations may involve testing the performance of device 36 at a variety of gain settings for amplifiers 50 and 52 and providing corresponding calibration results. Calibration results may be stored in device 36 (e.g., in battery-backed volatile memory or in nonvolatile memory). As shown in FIG. 2, device 36 may have memory such as memory 40 and memory 42 for storing calibration results. Calibration information may be loaded into device 36 via path 78 (as an example). Memory 42 may be internal memory that is build into integrated circuits such as baseband module 38. Memory 40 may be, for example, an external non-volatile memory (e.g., an erasable programmable read-only memory chip). During normal operation, baseband module 38 and other circuitry in device 36 may use the stored calibration information to ensure that device 36 transmits radio-frequency signals at appropriate powers.

During testing, antenna 66 need not be used. Rather, power sensor 72 may be coupled to output 58 of power amplifier 52 using radio-frequency connector 56. Radio-frequency connector 56 may include a radio-frequency switch that connects path 58 to output 60 and path 64. During testing, a probe or other structure associated with path 62 may be inserted into radio-frequency connector 56. The presence of this structure may open the radio-frequency switch and connect path 58 to path 62. In this configuration, radio-frequency signals from output 58 are routed to power sensor 72 over path 62 rather than antenna 66.

During normal operation of device 36, the probe or other structure associated with path 62 is not present (i.e., device under test 36 is no longer attached to test fixture 80). In this configuration, the radio-frequency switch in radio-frequency connector 56 moves into its normally closed position. The closed position of the radio-frequency switch in radio-frequency connector 56 allows radio-frequency signals to pass from path 58 to output 60 and path 64 for transmission through antenna 66.

Test and calibration software for system 34 may be implemented on computer 70. During calibration, computer 70 may use this software to direct device 36 to set its power amplifiers to various different gain settings. Gain settings may be adjusted by producing different control signals on power amplifier control path 48 and by producing different control signals on power amplifier control path 54. With one suitable arrangement, which is described herein as an example, computer 70 directs device 36 to produce a constant bias signal on path 54 (e.g., using control circuitry 44 or other suitable circuitry), so that the gain of external power amplifier 52 is maintained at a constant level. While the gain of power amplifier 52 is being maintained at a constant level, computer 70 may direct baseband module 38 to use digital-to-analog converter 46 or other suitable circuitry to produce a variety of different analog control voltages or digital control signals on path 48. These control signals, which are sometimes referred to as DAC values, can be received at the gain control input of power amplifier 50 to adjust the gain that is produced by power amplifier 50.

Calibration may involve directing control circuitry 44 in baseband module 38 to supply suitable test signals on path 82 while operating power amplifier 50 at a variety of different gains. At the same time, computer 70 can use power sensor 72 to make measurements of the amount of radio-frequency power that is driven onto path 58. The signals on path 58 are received by power sensor 72 via radio-frequency connector 56 and path 62.

Figure 3:
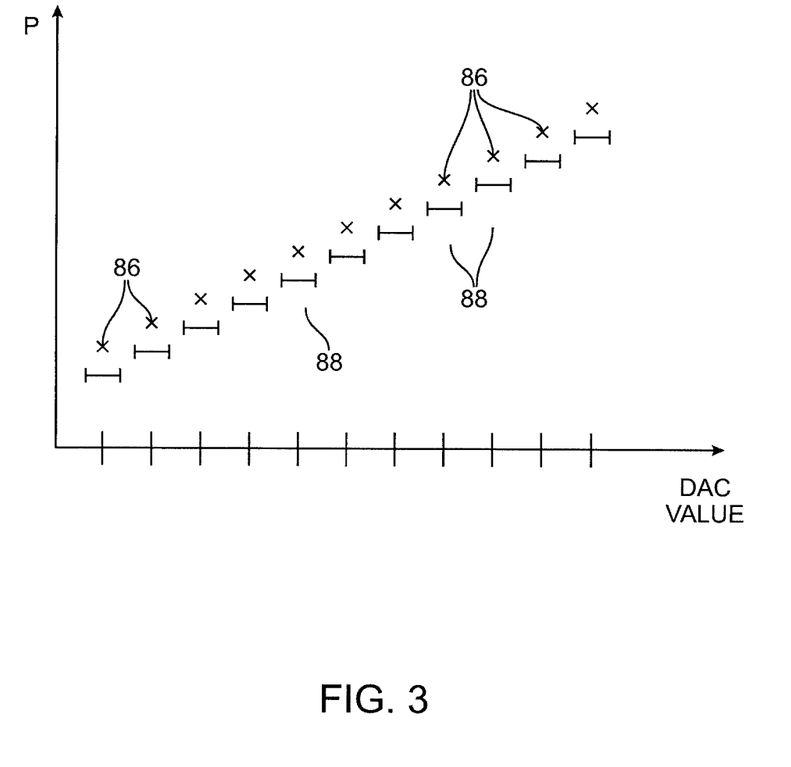
FIG. 3 is a graph showing how a system of the type shown in FIG. 2 may be used to take calibrating radio-frequency signal power measurements as a function of different amplifier gain settings in accordance with an embodiment of the present invention.

A graph of illustrative power measurements that may be made as a function of the DAC value on path 48 is shown in FIG. 3. In the graph of FIG. 3, DAC values (i.e., voltage settings for the output of digital-to-analog converter circuitry 46) are plotted on the horizontal axis and measured radio-frequency power values are plotted on the vertical axis. For each DAC value (or other suitable gain setting level), there is both a desired radio-frequency output level and an actual uncalibrated radio-frequency output level. The desired radio-frequency output level corresponds to the nominal value of radio-frequency signal power that should be produced when operating device 36 at a particular power amplifier gain setting. In some situations, the actual measured value for the radio-frequency signal power that are produced at that power amplifier gain setting are accurate, even before calibrating device 36. More generally, however, the power amplifier circuitry of device 36 will exhibit deviations from perfect behavior due to manufacturing variations. In this situation, the measured output power from device 36 prior to calibration will differ somewhat from the desired output power.

In the example of FIG. 3, desired output values 88 of radio-frequency output power on path 58 are plotted as a function of DAC value (gain setting). As indicated by the bar-shaped icons 88 in the graph of FIG. 3, each desired output power may be characterized by a range of permissible DAC values centered about the most probable point. During calibration measurements, power sensor 72 may be used to make measurements 86. If desired, the gain of power amplifiers 50 and 52 may be adjusted after one or more initial measurements, to ensure that the dynamic range of power sensor 72 is being used effectively. If these initial measurements indicate that the measured power 86 is significantly different than the desired power 88, the gain of the power amplifier circuitry can be adjusted prior to making subsequent measurements. This may increase the accuracy of the subsequent measurements.

In the example of FIG. 3, connecting the icons 88 produces the desired operating characteristic curve for the radio-frequency amplifier circuitry in device under test 36 and shows how the actual uncalibrated output powers 86 for device under test 36 may follow the curve shape of the desired operating characteristic, but may be offset to a different power level or may have an incorrect slope along the curve. In this illustrative situation, manufacturing variations have resulted in power amplifier circuitry 50 and 52 that is producing a radio-frequency output power on path 58 that is larger than expected. The gain of power amplifiers 50 and 52 (i.e., the gain produced by amplifier 50 for a given DAC setting) is therefore too high and should be reduced. The amount by which the gain setting should be reduced (i.e., the calibrating offset that should be used in operating amplifier 50) may be computed by computer 70 following measurement of data 86 of FIG. 3 and comparison to desired values 88. This calibration information may then be provided to device 36 over path 78 and stored in memory 40 or memory 42 for use in calibrating the operation of device 36 in normal operation.

Wireless electronic devices may operate at more than one frequency. For example, a device may operate in a variety of communications bands such as an 1800 MHz cellular telephone band and a 1900 MHz cellular telephone band. Even within a given band, a device may operate at more than one frequency. These different frequencies are typically referred to as channels.

Figure 4:
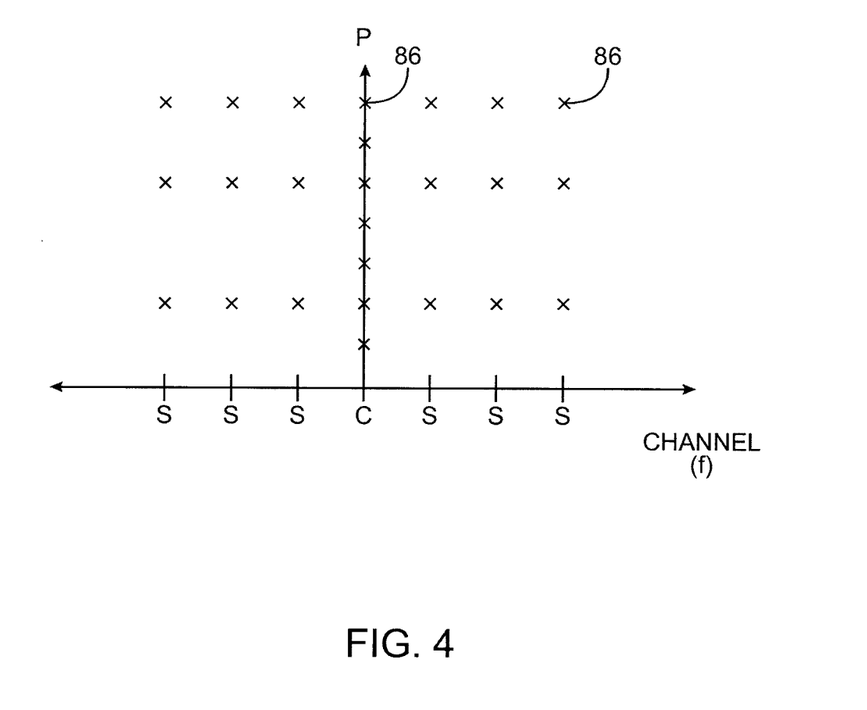
FIG. 4 is a graph illustrating how radio-frequency signal power measurements may be taken at different amplifier gain settings in multiple communications channels in accordance with an embodiment of the present invention.

As shown in FIG. 4, calibration measurements with system 34 may involve multiple operating frequencies (e.g., multiple channels). During these measurements, computer 70 may direct baseband module 38 to produce test signals (sometimes called test tones) for various different channels and various different power amplifier gain settings. The test tones may be pure (unmodulated) tones or may be formed by modulating radio-frequency tones (e.g., using pseudorandom bit sequences). If unmodulated test tones are used, the spectrum of the test signals will not generally exhibit side bands and will therefore be somewhat narrower in frequency than when modulated test tones are used. The power measurements 86 that are made based on unmodulated test tones may therefore be shifted somewhat from the results that would be obtained using tones that have been modulated with real-life data or pseudorandom data. A correction factor can be applied by computer 70 to account for this mismatch when pure test tones are used instead of modulated test tones.

Baseband module 38 may use its control circuitry 44 (e.g., digital signal processing circuitry, microprocessor circuitry, etc.) in generating modulated and unmodulated test tones. Baseband module 38 may also use its control circuitry (including DAC 46) to generate the control signals for power amplifier 50 (and, if desired, for power amplifier 52). Baseband module 38 may take these actions in response to control signals from computer 70. These control signals may be supplied to baseband module 38 over a data path or other suitable link 78. Control signals for baseband module 38 may be provided in real time (e.g., to direct baseband module 38 to produce tones in a particular order) or may be provided in advance (e.g., in the form of a set of batch instructions for baseband module 38). If instructions are provided in advance, computer 70 may be used to invoke the test during calibration.

Calibrating measurements that involve more than one communications channel may be performed by measuring one channel (or other subset of channels) more extensively than others. This allows the shape of the gain setting versus radio-frequency output power curve to be gathered accurately in the more extensively measured channel. This shape may then be applied to the other channels, whose measurements are primarily used to generate appropriate calibrating offset data. In the FIG. 4 example, more characterizing power measurements 86 have been made for channel C than for channels S. In a typical scenario, the channel or channels that are measured with relatively more measurements 86 may be characterized by five or more separate measurements, whereas the channel or channels that are measured with relatively fewer measurements 86 may be characterized using two, three, or four individual gain settings and corresponding power measurements (as an example). If desired, all channels may be measured the same number of times or each channel may be measured a potentially different number of times. These are merely illustrative examples. Any suitable pattern for making power measurements that cover a variety of gain settings, signal frequencies, and resulting radio-frequency powers may be used if desired.

Figure 5:
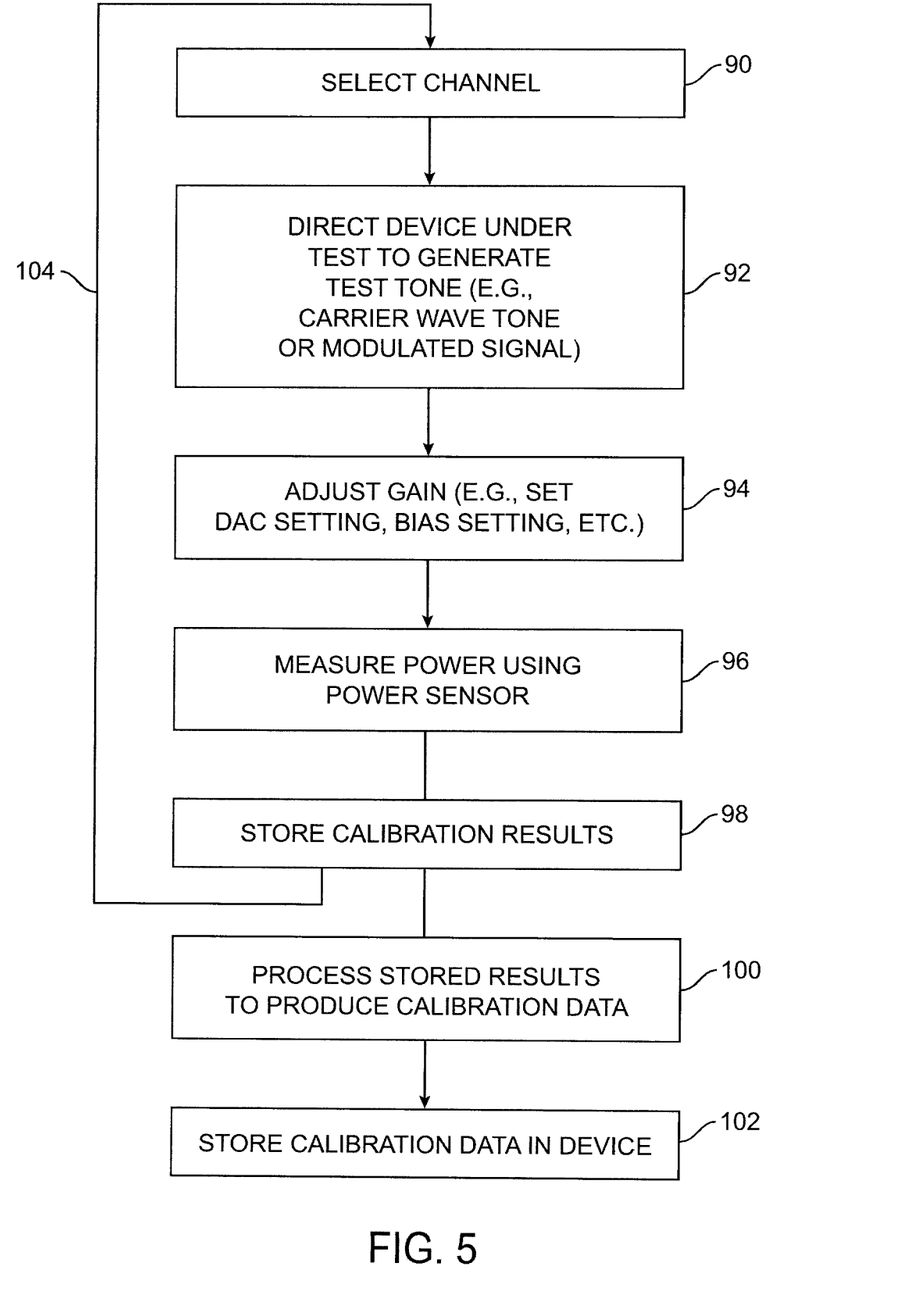
FIG. 5 is a flow chart of illustrative steps involved in calibrating wireless communications devices using a calibration system of the type shown in FIG. 2 in accordance with an embodiment of the present invention.

A flow chart of illustrative steps involved in using a system of the type shown in FIG. 2 in making calibrating radio-frequency signal power measurements is shown in FIG. 5. These measurements may be made using computing equipment such as computer 70 while device under test 36 is mounted to a suitable test fixture such as test fixture 80 or while the test equipment of system 34 is otherwise connected to device under test 36 to make calibrating measurements.

At step 90, a desired channel is selected for which to perform testing. Any suitable order may be used for selecting channels to test. For example, system 34 may be used to test channels in order, from lowest frequency to highest frequency. System 34 may also be used to test channels in a pseudorandom order, in an ordered or pseudorandom fashion within each of multiple communications bands, etc.

At step 92, computer 70 may be used to direct device under test 36 to generate a radio-frequency test tone on path 82 that corresponds to the frequency of the selected channel. Instructions for device under test 36 may be supplied to device under test 36 via path 78. Baseband module 38 may use control circuitry 44 to respond to the test tone generation instructions from computer 70. The test tone may be a pure carrier tone or may be a modulated tone (e.g., a tone that is modulated by baseband module 38 using a pseudorandom bit pattern). Because it is not necessary to set up a full protocol-compliant bidirectional radio-frequency link with external test equipment during step 92, the time required to generate the test tone may be modest, facilitating rapid testing.

At step 94, computer 70 may be used to direct device under test 36 to adjust power amplifiers such as power amplifiers 50 and 52 to produce desired amounts of gain for the radio-frequency test tone. If desired, control circuitry 44 may, for example, produce a constant bias or may direct external integrated circuits to produce a constant bias on path 54 for power amplifier 52 while simultaneously using digital-to-analog converter 46 or other suitable circuitry to produce a desired analog control voltage or digital control signal on path 48 that adjusts power amplifier 50 so that power amplifier 50 exhibits a desired amount of gain in amplifying the radio-frequency test tone signal on path 82.

After a desired radio-frequency test tone is being produced and after amplifier circuitry 50 and 52 has been adjusted to produce a desired amount of gain for the radio-frequency test tone, computer 70 may use power sensor 72 to gather a power measurement of the radio-frequency signal that is being produced on path 58 (step 96). During this test measurement, the radio-frequency signal on path 58 may be routed to power sensor 72 via radio-frequency connector 56 and transmission line path 62 (e.g., a radio-frequency cable).

Test measurement results may be stored at step 98. Computer 70 may store measurement results in storage 74 in any desired format (e.g., tables, etc.).

As indicated by line 104, if additional test measurements are desired, processing may loop back to steps 90, 92, 94, 96, and 98. During these calibration measurements, calibration system 34 may step through various different test tone frequencies (wireless channels) and various different gain settings for amplifier circuitry 50 and 52 (e.g., DAC settings for power amplifier 50) using any suitable pattern. For example, channels may be calibrated one at a time while gain of the power amplifier circuitry (i.e., the gain of amplifier 50) may be adjusted by stepping through the possible gains settings from a desired minimum to a desired maximum value. Alternatively, all of the calibration measurements for a particular gain setting may be made by adjusting the frequency of the test tone while holding the gain setting constant. If desired, combinations of these approaches may be used (e.g., to produce measurement patterns in which both channel settings and gain settings are adjusted in each pass through loop 104).

After power measurements have been completed, computer 70 may process the test data to produce calibration data for the device under test. For example, if it is determined that each measured power is about 10% higher than expected, calibration data may be produced that will inform device under test 36 to reduce the gain setting of its power amplifier circuitry (e.g., power amplifier 50) by 10% to compensate. The calibration data that is produced at step 100 may be provided to device 36 over path 78. Baseband module 38 may store the calibration data in memory such as internal memory 42 or external memory 40. During operation by a user, a calibrated device 36 will use the calibration data to make necessary corrections to the control signals used in controlling power amplifier circuitry 50 and 52 (e.g., by adjusting DAC settings on path 48), thereby ensuring that device 36 produces desired output power levels.

The foregoing is merely illustrative of the principles of this invention and various modifications can be made by those skilled in the art without departing from the scope and spirit of the invention.

What is claimed is:

1. A method of calibrating a radio-frequency power amplifier in a handheld electronic device, wherein the handheld electronic device comprises a baseband module having a digital-to-analog converter that produces an analog control voltage that is received at a control input of the radio-frequency power amplifier and that controls how much gain is provided by the radio-frequency power amplifier when amplifying radio-frequency signals, wherein the handheld electronic device has a radio-frequency connector at which amplified versions of the radio-frequency signals are provided by the radio-frequency amplifier, wherein a computer is connected to the handheld electronic device during calibration operations, and wherein a power sensor is coupled to the radio-frequency connector by a transmission line, the method comprising:

with the power sensor, making power measurements on the amplified versions of the radio-frequency signals over the transmission line;

with the computer, producing calibration data for the radio-frequency power amplifier based at least partly on the power measurements;

with the computer, directing the digital-to-analog converter to adjust the gain of the radio-frequency power amplifier by changing the analog control voltage while the power sensor gathers the power measurements;

storing the calibration data in memory associated with the baseband module, wherein producing the calibration data comprises producing the calibration data in a plurality of radio-frequency communications channels at which the handheld electronic device operates; and with the computer, directing the baseband module to generate test signals at multiple calibration power levels for each of the plurality of radio-frequency communications channels while the power sensor gathers the power measurements, wherein making the power measurements comprises completing the power measurements needed to produce the calibration data by making more power measurements in at least one of the plurality of radio-frequency communications channels than are made in other ones of the plurality of radio-frequency communications channels, wherein at least one power measurement is made in the other ones of the plurality of radio-frequency communications channels.

2. The method defined in claim 1, wherein the handheld electronic device comprises a cellular telephone.

3. The method defined in claim 1, wherein the handheld electronic device comprises a handheld computer.

4. The method defined in claim 1, wherein the handheld electronic device comprises a media player.

5. The method defined in claim 1 wherein directing the baseband module to generate the test signals comprises:
   directing the baseband module to generate an unmodulated test tone for each of the plurality of radio-frequency communications channels.

6. The method defined in claim 1 wherein directing the baseband module to generate the test signals comprises:
   directing the baseband module to generate a modulated test tone from a pseudorandom bit pattern for each of the plurality of radio-frequency communications channels.

7. The method defined in claim 1, wherein the radio-frequency connector comprises a radio-frequency switch.

8. A method of calibrating wireless circuitry including a radio-frequency power amplifier and a baseband module, the method comprising:
   with a computer, directing the baseband module to generate radio-frequency test signals in a plurality of frequency channels, wherein the radio-frequency test signals are amplified by the radio-frequency power amplifier;
   with a power sensor, making a first plurality of power measurements on the amplified radio-frequency signals in a first frequency channel of the plurality of frequency channels; and
   with the power sensor, making a second plurality of power measurements on the amplified radio-frequency signals in a second frequency channel of the plurality of frequency channels, wherein the first plurality of power measurements in the first frequency channel includes more power measurements than the second plurality of power measurements in the second frequency channel.

9. The method defined in claim 8 further comprising:
   with the computer, determining a radio-frequency output power curve based on the first plurality of power measurements in the first frequency channel; and
   with the computer, generating power amplifier calibration data for the first frequency channel based on the radio-frequency output power curve.

10. The method defined in claim 9 further comprising:
    with the computer, generating offset data from the second plurality of power measurements in the second frequency channel; and
    with the computer, generating power amplifier calibration data for the second frequency channel by applying the radio-frequency output power curve to the offset data.

11. The method defined in claim 8 wherein directing the baseband module to generate the radio-frequency test signals in the plurality of frequency channels comprises:
    directing the baseband module to generate an unmodulated test tone for each of the plurality of frequency channels.

12. The method defined in claim 8 wherein directing the baseband module to generate the radio-frequency test signals in the plurality of frequency channels comprises:
    directing the baseband module to generate a modulated test tone from a pseudorandom bit pattern for each of the plurality of frequency channels.

13. The method defined in claim 8, wherein the computer comprises a personal computer.

14. The method defined in claim 8, wherein the computer comprises a test equipment station having an associated processor.

15. The method defined in claim 8, wherein the power sensor comprises a diode and a resistor.

16. The method defined in claim 8, wherein the wireless circuitry comprises wireless communications circuitry for a handheld electronic device.

* * * * *